United States Patent
Rao et al.

(10) Patent No.: US 7,734,264 B2
(45) Date of Patent: Jun. 8, 2010

(54) SYSTEM FRAME NUMBER (SFN) EVALUATOR

(75) Inventors: Anil S. Rao, San Diego, CA (US);
Chandra Kumar, Farnborough (GB);
Gurdeep Singh, San Diego, CA (US);
Kiran Chikkappa, San Diego, CA (US);
Messay Amerga, San Diego, CA (US);
Maheedhar Gollamudi, San Diego, CA (US); Sudarshan Keshava, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 558 days.

(21) Appl. No.: 11/468,263

(22) Filed: Aug. 29, 2006

(65) Prior Publication Data

US 2008/0056422 A1 Mar. 6, 2008

(51) Int. Cl.
*H04B 1/04* (2006.01)
(52) U.S. Cl. .................. 455/127.5; 455/67.11; 455/574
(58) Field of Classification Search .............. 455/343.2, 455/403, 414.1, 522, 67.11, 550.1, 574, 95, 455/115.1, 127.1, 130
See application file for complete search history.

(56) References Cited

U.S. PATENT DOCUMENTS

| 6,088,602 A | 7/2000 | Banister | |
|---|---|---|---|
| 6,625,467 B2 * | 9/2003 | New et al. ................... | 455/525 |
| 2006/0182147 A1 * | 8/2006 | Sanchez ..................... | 370/503 |
| 2007/0064662 A1 * | 3/2007 | Bultan et al. ................ | 370/338 |

FOREIGN PATENT DOCUMENTS

| GB | 2329795 | 3/1999 |
|---|---|---|
| WO | 9510141 | 4/1995 |
| WO | WO 9810609 | 3/1998 |
| WO | WO 9858460 | 12/1998 |
| WO | 0133870 | 5/2001 |

OTHER PUBLICATIONS

International Search Report—PCT/US07/077028, international Search Authority—European Patent Office—Jan. 24, 2008.

* cited by examiner

*Primary Examiner*—Tony T Nguyen
(74) *Attorney, Agent, or Firm*—George Christ Pappas; Francis A. Pelaez

(57) ABSTRACT

An access terminal (102) reacquires a system frame number (SFN) when a difference between a continuous counter elapsed time (220) and a calculated elapsed time (222) exceeds a threshold. The continuous counter elapsed time (220) is generated by a continuous counter (122) remaining active during a sleep state of the access terminal (102) and the calculated elapsed time (222) is based on a SFN derived from a counter value generated by a discontinuous counter (124) that is deactivated during the sleep state. In one aspect, the continuous counter (122) may be clocked by a continuous clock (118) during a sleep mode and the discontinuous counter (124) may be clocked by a faster clock (120) that is deactivated during the sleep mode. During reactivation after the sleep mode, the discontinuous counter (120) is set, at the counter set time, to a reset counter value (126) corresponding to an SFN indicated by the continuous counter (122).

33 Claims, 3 Drawing Sheets

US 7,734,264 B2

SYSTEM FRAME NUMBER (SFN) EVALUATOR

BACKGROUND

1. Field

The present invention relates generally to synchronization in communication systems, and more specifically to system frame number error detection.

2. Background

Many wireless communication systems employ communication protocols that arrange control information and data into frames where an access terminal (user communication device) references the timing of reception and transmission tasks based on a system frame number (SFN). An access terminal, for example, may access information transmitted from a communication network within a particular frame referenced to the current (SFN). Accordingly, the access terminal must maintain frame synchronization with a communication network by tracking and updating the SFN in order to properly receive information. For example, in an asynchronous communication system such as system operating in accordance with WCDMA standards, a base station pages the access terminal during Paging Occasions that are based on the SFN of the cell at the particular time. The access terminal deciphers a frame of a Page Indicator Channel (PICH) where the frame is based on the current SFN. If the SFN of the access terminal is not synchronized to the SFN of the cell, the access terminal will not receive a page and will not be able to receive calls. One potential method for maintaining SFN synchronization between the access terminal and the cell includes requiring the access terminal to constantly monitor a Broadcast Channel (BCH) where each BCH block includes an encoded SFN. Unfortunately, this technique is not practical due to the resulting power consumption and negative impact on battery life of the access terminal. Some conventional systems allow the access terminal to rely on the SFN that is maintained at the access terminal without monitoring the BCH. This technique is limited since if the SFN is incorrect at the access terminal, the access terminal will not be able to receive calls or otherwise maintain frame synchronization with the communication network.

Accordingly, there is a need for system frame number (SFN) evaluation.

SUMMARY

An access terminal reacquires a system frame number (SFN) when a difference between a continuous counter elapsed time and a calculated elapsed time exceeds a threshold. The continuous counter elapsed time is generated by a continuous counter remaining active during a sleep state and the calculated elapsed time is based on a SFN derived from a counter value generated by a discontinuous counter that is deactivated during the sleep state. In one aspect, the continuous counter may be clocked by a continuous clock during a sleep mode of the access terminal and the discontinuous counter may be clocked by a faster clock that is deactivated during the sleep mode. During reactivation after the sleep mode, the discontinuous counter is set, at the counter set time, to a reset counter value corresponding to an SFN indicated by the continuous counter.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
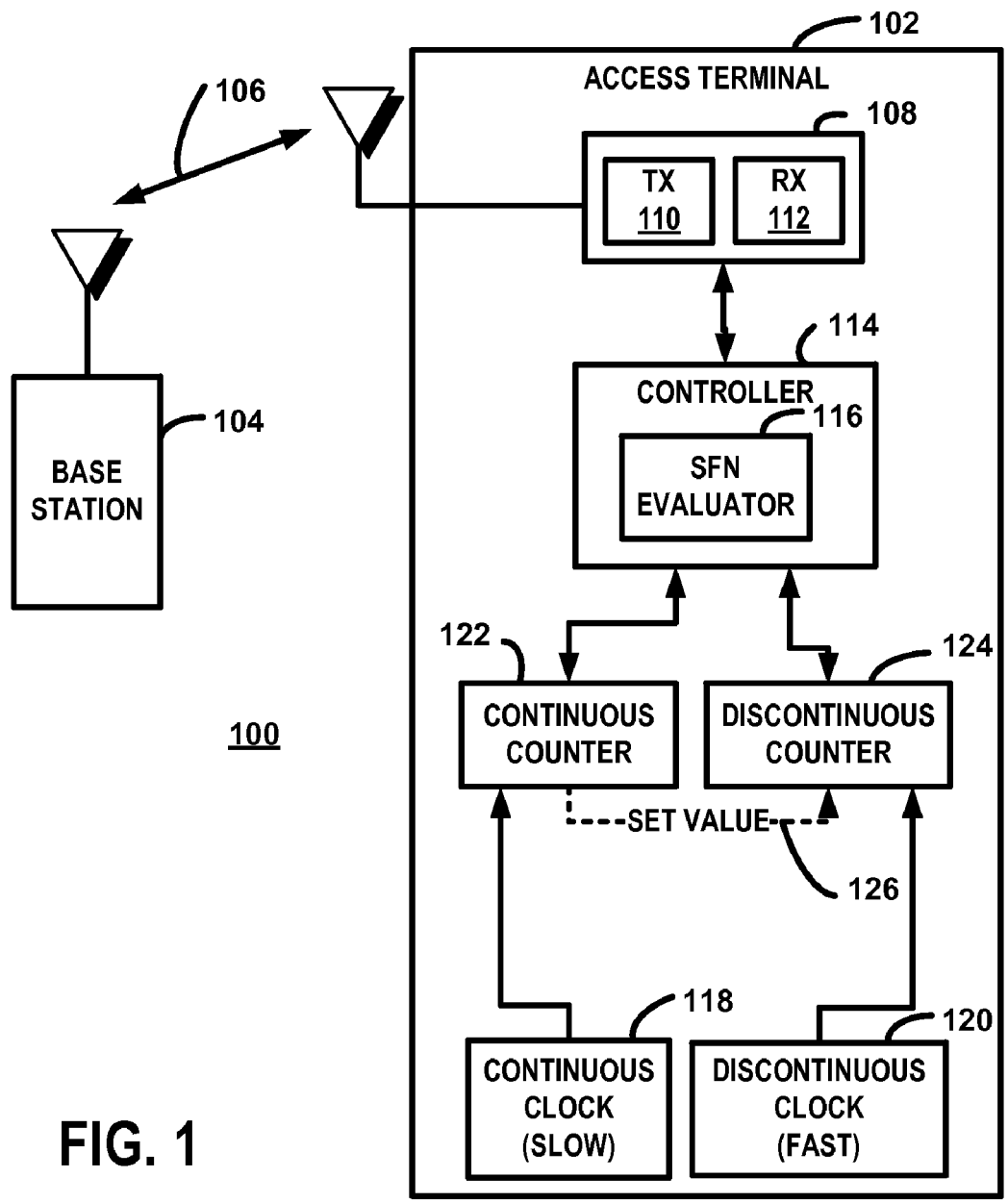
FIG. 1 is a block diagram of communication system 100 in accordance with the exemplary embodiment of the invention.

FIG. 1 is a block diagram of communication system 100 in accordance with the exemplary embodiment of the invention. The communication system 100 includes at least one access terminal 102 communicating with at least one base station 104 through a wireless communication link 106. In most implementations, however, several base stations 104 connected through a communication network provide wireless service to access terminals 102 within a plurality of geographical areas. For example, base stations 104 may be connected through wired or wireless backhaul to base station controllers and a network controller.

The access terminal 102 is any wireless communication device that communicates with one or more base stations through the wireless communication link 106 and is also referred to as a remote terminal, modem, portable communication device and user equipment, among other terms. Examples of access terminals 102 include, but are not limited to, cellular telephones, wireless personal digital assistants (PDAs), wireless modems, and wireless PCMCIA cards. The access terminal 102 may include hardware, software, and/or firmware not shown in FIG. 1 for facilitating and performing the functions of the access terminal 102. For example, the access terminal 102 may include input and output devices such as keypads, displays, microphones and speakers in some circumstances. The various functions and operations of the blocks described with reference to the access terminal 102 may be implemented in any number of devices, circuits, or elements. Two or more of the functional blocks may be integrated in a single device and the functions described as performed in any single device may be implemented over several devices in some circumstances. For example, some of the functions of a transceiver 108 may be performed by a controller 114 in some circumstances.

In the exemplary embodiment, the access terminal 102 and base station 104 transmit and receive signals in accordance with WCDMA protocols and standards. The techniques discussed herein however, may be applied to any communication system 100 that requires an access terminal to receive, transmit, or process information based on a system frame number (SFN). In accordance with WCDMA standards, the SFN sequence is a sequence of 12 bit numbered frames from 0 to 4095 that continually repeats. Each SFN cycle completes in 40.96 seconds since each frame has a length of 10 ms. The current SFN is transmitted by the base station on the Broadcast Channel (BCH) through the wireless communication link 106.

In accordance with the exemplary embodiment, the access terminal 102 includes an SFN evaluator 116 that indicates a possible error in the SFN that is maintained at the access terminal 102 when certain conditions are met. The SFN evaluator 116 may be implemented in any combination of hardware, software and/or firmware. In the exemplary embodiment, software code running on the controller 114 executes the calculations, comparisons, and adjustments to perform the functions of the SFN evaluator 116. The controller 114 includes any combination of software, hardware and/ or firmware for executing the functions described herein as well as facilitating the overall functionality of the access terminal 102. In the exemplary embodiment, the controller 114 includes a processor such as a microprocessor and any necessary hardware.

A transceiver 108 in the access terminal 102 includes a transmitter 110 and receiver 112 for communicating with the base station 104 through the wireless communication link 106. The receiver 112 is configured to receive the BCH to allow a controller 114 to decode the current SFN. The receiver 112 also receives control channels that are based on the SFN. Accordingly, the controller 114 extracts the appropriate system information from the various channels based on the SFN estimate that is maintained at the access terminal 102. For example, a paging indictor channel (PICH) is transmitted in accordance with a discontinuous reception (DRX) scheme over the cell of the base station 104 where the unique location of the paging indicator is based on the SFN.

DRX facilitates a sleep cycle for the access terminal 102 allowing the access terminal to periodically deactivate and reactivate circuits to conserve power. The access terminal powers up deactivated circuits and components prior to the arrival of the PICH. Accordingly, the access terminal 102 maintains an estimate of the SFN when in the sleep state in order to reactivate circuits and timely receive the paging indicator in the PICH.

In accordance with the exemplary embodiment, a continuous clock 118 and discontinuous clock 120 are used for timing and SFN synchronization where the continuous clock 118 is slower and consumes less power than the discontinuous clock 120. The discontinuous clock 120 is a "fast" clock that has a frequency and accuracy greater than the continuous clock 118 and provides a reference for radio frequency functions as well as processor and logic tasks during non-sleep operation of the access terminal 102. The discontinuous clock 120 typically has a frequency equal to a frequency 32 times the chip rate. Another example of a suitable frequency is 8 times the chip rate. An example of a suitable discontinuous clock includes a crystal clock oscillator operating at 122.88 MHZ. The continuous clock 118 provides a reference for a continuous counter 122 that generates a continuous counter value indicative of a first SFN estimate. During the sleep state, the continuous counter 122 is clocked by the continuous clock 118 and provides the only information regarding the SFN. In the exemplary embodiment, the continuous counter 122 is a 32 bit counter that counts from 0 to 4294967295 and the continuous clock 118 has a frequency of 32.768 kHz. The continuous counter 122 increments every slow clock period ($1/32768$) equal to 30 micro seconds. Therefore, the continuous clock 122 starts at 0 and increments by 1 every 30 microseconds. The continuous clock 122 returns to 0 every $2^{32}/32768$ seconds which is equal to approximately 36 hours. In some cases where the counter is smaller such as 16 bit counter, additional rollover counters or logic may be necessary to allow the counter to count to the appropriate value.

After reactivation of the discontinuous clock 120 and other circuits deactivated during the sleep state, the discontinuous counter 124 is set with a counter set value 126 that corresponds to the first estimated SFN indicated by the continuous counter 118. In the exemplary embodiment, adequate time is allowed for the discontinuous clock 120 to stabilize before the discontinuous counter 124 is set with the counter set value 126. Accordingly, the counter set time is at a time after the reactivation of the discontinuous clock 120 but before the arrival of the PICH.

The controller 114 calculates the counter set value 126 for the discontinuous counter 124 based on the continuous counter value and the anticipated time that the discontinuous counter 124 will be set (counter set time) such that if the discontinuous counter 124 is set properly, the discontinuous counter 124 and the continuous counter 122 will both indicate the same estimated current SFN. If, however, an error event occurs, the discontinuous estimated current SFN indicated by the discontinuous counter value will be different from the continuous estimated current SFN indicated by the first counter 122. An error event may be due to any of numerous conditions or reasons. Examples of error event causes include software bugs, race conditions, clock glitches, long interrupts and long interrupt locked periods. Accordingly, an error event is any event or mismatch that negatively affects the reactivation of the discontinuous clock 120, calculation of the counter set value 126, the setting of the discontinuous counter 124, or otherwise causes a mismatch between the SFNs corresponding to the two counter values.

In accordance with the exemplary embodiment, the controller performs a SFN evaluation procedure just prior to entering every sleep cycle. The SFN evaluation procedure may be performed anytime between the reactivation of the circuits after sleep and the following deactivation of circuits for the next sleep cycle, however. Further, in some circumstances, the SFN evaluation procedure is not performed at every cycle. For example, if the current SFN is obtained from the network during the active cycle immediately prior to a sleep cycle, the SFN error detection procedure is not performed.

The exemplary SFN evaluation procedure includes comparing the continuous counter elapsed time and a calculated elapsed time where the calculated elapsed time is based on the SFN derived from the discontinuous counter. If the time difference between the continuous counter elapsed time and the calculated time is greater than a threshold, the controller initiates an SFN reacquisition procedure. In the exemplary embodiment, the threshold is 7.0 milliseconds. Other thresholds may be used in some circumstances. Selection of the threshold is based on the particular implementation and takes balances the possibility of falsely determining an error has occurred with the possibility of missing a SFN error. With long DRX cycles such as where Paging Occasions separated by 5.12 second, elapsed time differences may eventually drift to 4 or 5 ms. Accordingly, a threshold greater than 5 ms but less than 10 ms is appropriate in some circumstances. A threshold between 6 ms and 9 ms provides less chance for false positives and missed errors.

The SFN reacquisition procedure may be invoked in circumstances other than the exceeding of the threshold. For example, the SFN reacquisition procedure may be performed periodically regardless of the difference between the calculated elapsed time and the continuous counter elapsed time. In the exemplary embodiment, a SFN reacquisition timer invokes the SFN reacquisition procedure every 2 hours.

Figure 2:
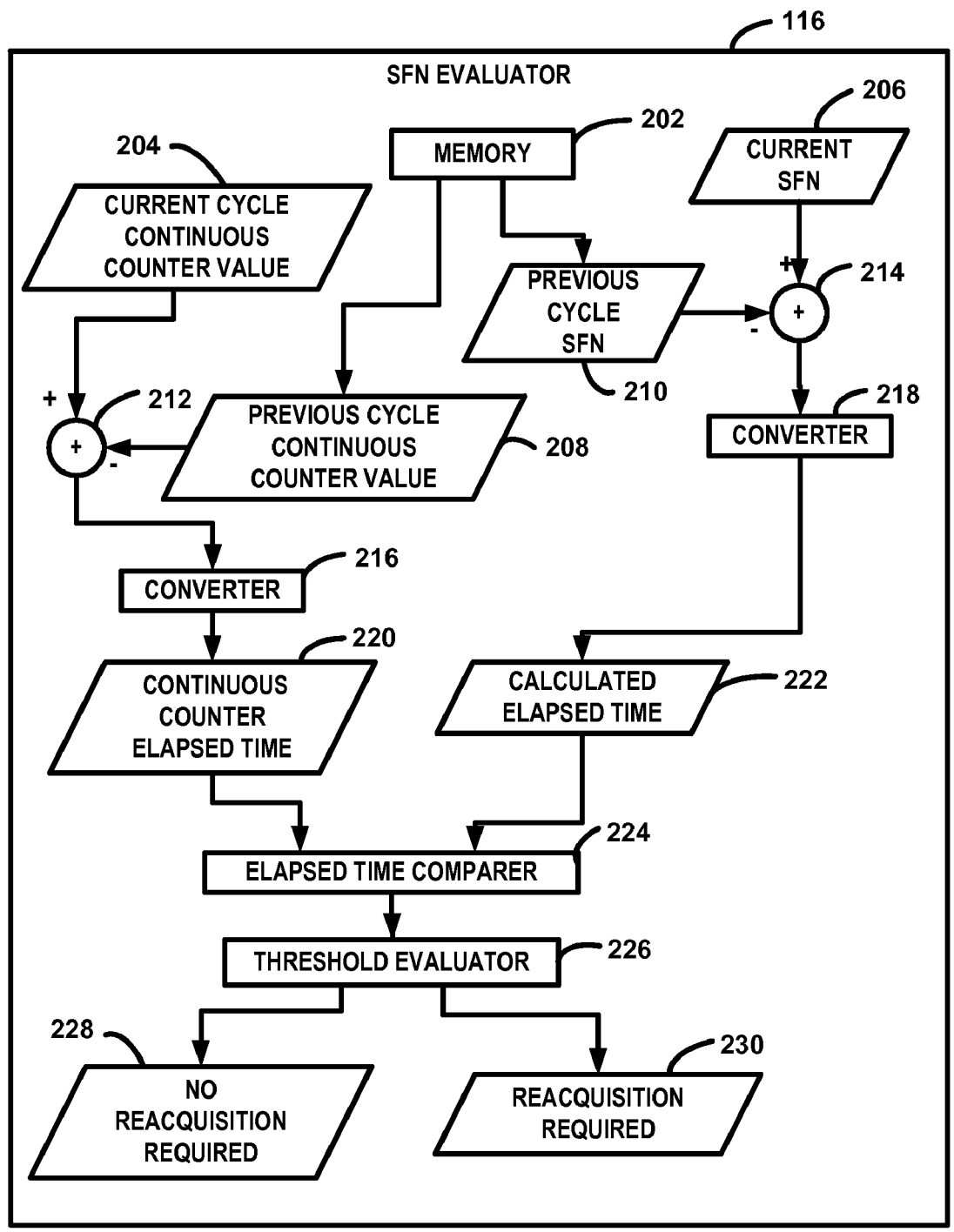
FIG. 2 is a block diagram of an exemplary implementation.

FIG. 2 is a block diagram of an exemplary implementation of the system frame number (SFN) evaluator 116. As discussed above, code running on a processor performs the functions of the SFN evaluator 116 in the exemplary embodiment. The SFN evaluator 116, however, may be implemented with any combination of hardware, software, and/or firmware. Further, the various functions and operations of the blocks described with reference to the SFN evaluator 116 may be implemented in any number of devices, circuits, or elements. Two or more of the functional blocks may be integrated in a single device and the functions described as performed in any single block may be implemented over several devices in some circumstances. Depending on the particular implementation, the order of execution of the various tasks may be different in some circumstances.

The SFN evaluator 116 evaluates the difference between the elapsed times indicated by the continuous counter and the calculated elapsed time based on the SFN derived from the discontinuous counter to determine if the SFN timing maintained at the access terminal 102 may be inaccurate. If the elapsed time indicated by continuous counter value indicates an elapsed time that differs from the calculated elapsed time indicated by the SFN and the discontinuous counter by more than a threshold, the SFN evaluator 116 invokes the SFN reacquisition procedure.

In the exemplary embodiment, the SFN evaluator 116 includes, or has access to, a memory 202. The memory 202 is any type of memory device suitable for storing the counter values and the SFN. Before entering a sleep state, the current SFN and continuous counter value are stored in memory 202. In some circumstances, values other than the SFN may be stored. For example, the discontinuous counter value may be stored. During the sleep state, circuits, except for the continuous clock 118 and continuous counter 122, are deactivated. The discontinuous clock 120 and discontinuous counter 124 are deactivated during the sleep state. When the access terminal 102 exits the sleep state, the deactivated circuits are activated. After the discontinuous clock 120 has stabilized, the discontinuous counter 124 is set with a counter value corresponding to the SFN indicated by the continuous counter value (set value 126) as discussed above.

The SFN evaluator 116 evaluates the SFN and the continuous counter value before the next sleep cycle in order to determine if the discontinuous counter 124 has been incorrectly set or if there is otherwise a discrepancy between the SFN and the continuous clock 122. The SFN evaluator 116 can be invoked at any time during the active (non-sleep) cycle before the next sleep state.

The SFN evaluator 116 retrieves the previous cycle continuous counter value 208 from memory 202. An adder 212 subtracts the previous cycle continuous counter value 208 from the current cycle continuous counter value 204 to generate a value indicative of the elapsed time of the continuous counter 122. In the exemplary embodiment, is in units of clock cycles of the continuous clock 118. A converter converts the value generated by the adder 212 into a continuous counter elapsed time 220 that has units of time such as for example, milliseconds.

The previous cycle SFN 210 is retrieved from memory and subtracted from the current SFN 206 by an adder 214 to generate a value indicative of the calculated elapsed time based on the SFN. As described herein, the SFN values include the frame number as well as the sub frame number. Accordingly, calculations involving the SFN values account for the frame number and the sub frame number. The previous cycle SFN may be stored in other units in some implementations. For example, the previous cycle SFN 210 and the current SFN 206 may be in units of time in some cases. The converter 218 converts the value generated by the adder 214 to a calculated elapsed time 222 that has units of time consistent with the continuous counter elapsed time 220 in order that the elapsed times 220, 222 may be appropriately compared in the elapsed time comparer 224.

In the exemplary embodiment, the elapsed time comparer 224 determines a difference between the calculated elapsed time and the continuous counter elapsed time 220. The absolute value of the difference is compared to a threshold by the threshold evaluator 226. If the difference is greater than the threshold, the SFN evaluator 116 determines that the SFN is not reliable and invokes a SFN reacquisition procedure by indicating that reacquisition is required with a reacquisition required indicator 230. Otherwise, a no reacquisition required indicator 228 is generated. As explained above, a reacquisition procedure may be invoked by the controller in response to other conditions in addition to the generation of the reacquisition required indicator 230. The SFN reacquisition procedure may be periodically performed or the detection of other errors may invoke the procedure.

Figure 3:
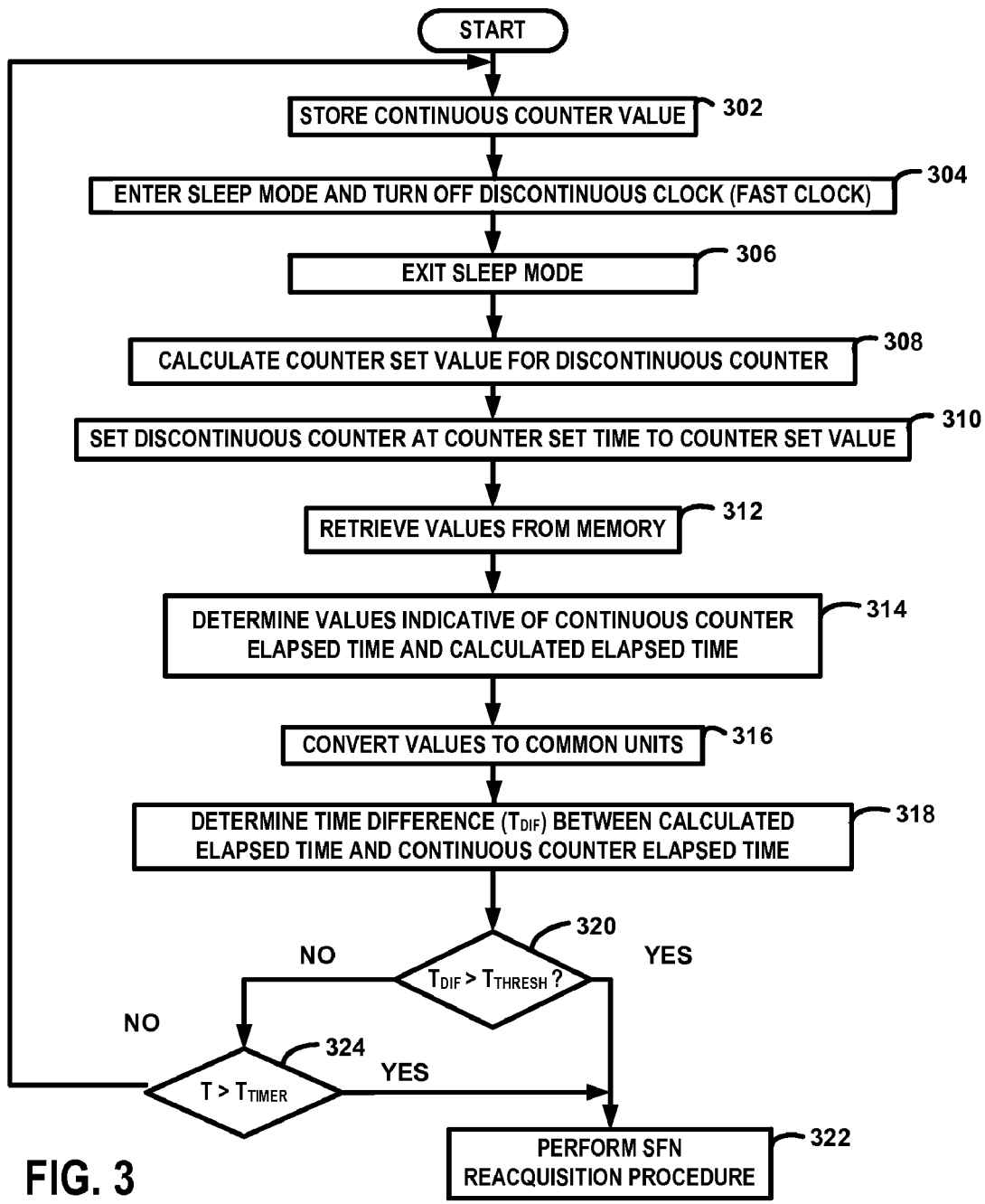
FIG. 3 is a flow chart in accordance with an exemplary embodiment.

FIG. 3 is a flow chart of a method of performing the SFN evaluation procedure in accordance with the exemplary embodiment of the invention. Although the method is performed by executing code on the processor in the exemplary embodiment, the methods may be performed by any combination of software, hardware and/or firmware. Further, the steps discussed with reference to FIG. 3 may be performed in any order and two or more steps may be performed simultaneously in some circumstances.

At step 302, the value of the continuous counter 122 is stored in memory 202. A "snapshot" of the counter value is taken prior to entering the sleep mode at step 304.

At step 304, the discontinuous clock is turned off and the access terminal enters the sleep state. In the exemplary embodiment, the discontinuous counter and other circuits are deactivated in addition to the discontinuous clock in the sleep state. The continuous counter 122 and the continuous clock 118 remain active in the sleep state.

At step 306, the access terminal 202 exits the sleep state. The discontinuous clock, discontinuous counter and other circuits are activated (turned on). The discontinuous clock is provided adequate time to stabilize before the procedure continues at step 310.

At step 310, the discontinuous counter 124 is set to the counter set value 126. The counter set value 126 is calculated based on the current value of the continuous counter 122 and the counter set time such that the discontinuous counter 124 should reflect the same SFN as the continuous counter 122 after the discontinuous counter 124 is set.

At step 312, the previous cycle continuous counter value 208 and the previous cycle SFN 210 are retrieved from memory 202. In some circumstances, the current SFN 206 and the current cycle continuous counter value 204 may also be retrieved from memory 202. For example, the current SFN 206 and the current cycle continuous counter value 204 may be captured and temporarily stored in memory 202 before or during the SFN evaluation procedure.

At step 314, the values indicative of the continuous counter elapsed time and the calculated elapsed time based on the SFN are determined. The difference between the previous cycle values and the current cycle values is determined. As explained above, although these values correspond to t an elapsed time, the values may have units that are not time. For example, the units may be clock cycles or SFN and SFN sub frames.

At step 316, the values are converted to elapsed time values. Accordingly, the continuous counter elapsed time 220 and the calculated elapsed time 222 are generated. An example of a suitable unit of measure includes milliseconds. In some circumstances, the conversions may occur before calculating the differences between the current and previous values.

At step 318, the time difference ($T_{DIFF}$) between the calculated elapsed time based on the SFN and the continuous counter elapsed time is determined. The absolute value of the difference is used in step 320 since the calculated elapsed time may be greater than or less than the continuous counter elapsed time.

At step 320, the time difference ($T_{DIFF}$) is compared to a threshold. If the time difference is greater than the threshold, the SFN reacquisition procedure is performed at step 322.

Otherwise, the method continues at step 324. The threshold in the exemplary embodiment is 7 milliseconds.

At step 324, it is determined whether the elapsed time since the SFN was received from the network exceeds a timer threshold. If the time since the last SFN reception is greater than the timer threshold, the procedure proceeds to step 322. Otherwise, the method returns to step 302 continue with the next DRX cycle.

At step 322, the SFN reacquisition procedure is performed. As discussed above, the BCH is received decoded and processed to acquire the encoded SFN. The newly acquired SFN is used to set the discontinuous counter 124.

The methods and apparatus of this invention may take the form, at least partially, of program logic or program code (i.e., instructions) embodied in tangible media, such as floppy diskettes, CD-ROMs, hard drives, random access or read only memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, through a wireless interface or via any other form of transmission. When the program code is received and loaded into and executed by a machine, such as a processor, the machine becomes an apparatus for practicing the invention. When implemented on a general-purpose processor, the program code combines with the processor to provide a unique apparatus that operates analogously to specific logic circuits. Accordingly, a program product including instructions contained on a computer-readable medium results in the performance of one or more steps discussed with reference FIG. 3 when the program product is executed by a controller or processor.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system frame number (SFN) evaluator for evaluating a SFN maintained in a communication device utilizing the SFN as a reference for communication, the SFN evaluator comprising:
   an elapsed time comparer configured to determine a time difference between a continuous counter elapsed time and a calculated elapsed time, the continuous counter elapsed time generated by a continuous counter remaining active during a sleep state and the calculated elapsed time based on a SFN derived from a counter value generated by a discontinuous counter deactivated during the sleep state; and
   a threshold evaluator configured to invoke a SFN reacquisition procedure if the time difference is greater than a threshold.

2. An SFN evaluator in accordance with claim 1, wherein the continuous counter is clocked at a first clock frequency and the discontinuous counter is clocked at a second clock frequency greater than the first clock frequency.

3. An SFN evaluator in accordance with claim 1, wherein the SFN reacquisition procedure comprises receiving a current SFN indicator from a communication network.

4. An SFN evaluator in accordance with claim 3, wherein the SFN reacquisition procedure comprises receiving the current SFN indicator in a Broadcast Channel (BCH).

5. An SFN evaluator in accordance with claim 3, further comprising a timer configured to invoke the SFN reacquisition procedure when a time from the last SFN reception from the network is greater than a timer threshold.

6. An access terminal comprising:
   a receiver configured to receive a wireless control signal comprising a system frame number (SFN) providing a reference for receiving paging signals from a base station;

a continuous counter configured to remain active during an access terminal sleep state and to generate a continuous counter value;

a discontinuous counter configured to be deactivated during at least a portion of the access terminal sleep state and to generate, based on an elapsed time from a counter set time, a discontinuous counter value indicative of an access terminal current SFN; and a controller configured to invoke an SFN reacquisition procedure based on a difference between an continuous counter elapsed time and a calculated elapsed time based on the access terminal current SFN.

7. An access terminal in accordance with claim 6, wherein the continuous counter elapsed time is based on a difference between a current cycle continuous counter value and a previous cycle continuous counter value.

8. An access terminal in accordance with claim 7, wherein the calculated elapsed time is based on a difference between the access terminal current SFN and a previous cycle SFN.

9. An access terminal in accordance with claim 8, wherein the access terminal current SFN is derived from a discontinuous counter value generated by a discontinuous counter deactivated during the sleep state.

10. An access terminal in accordance with claim 9, wherein the discontinuous counter is activated and set to a counter set value based on the current cycle continuous counter value.

11. An access terminal in accordance with claim 10, wherein the controller is configured to invoke the SFN reacquisition procedure if the time difference is greater than a threshold.

12. An access terminal in accordance with claim 11, wherein the continuous counter is clocked at a first clock frequency and the discontinuous counter is clocked at a second clock frequency greater than the first clock frequency.

13. An access terminal in accordance with claim 6, wherein the SFN reacquisition procedure comprises receiving a current SFN indicator from a communication network.

14. An access terminal in accordance with claim 13, wherein the SFN reacquisition procedure comprises receiving the current SFN indicator in a Broadcast Channel (BCH).

15. An access terminal in accordance with claim 14, further comprising a timer configured to invoke the SFN reacquisition procedure when a time from a last SFN reception from the network is greater than a timer threshold.

16. A program product for evaluating a system frame number (SFN), the program product comprising computer-executable instructions contained on a computer-readable medium and configured for causing the following computer-executed steps to occur when executed by a processor:

determining a time difference between a continuous counter elapsed time and a calculated elapsed time, the continuous counter elapsed time generated by a continuous counter remaining active during a sleep state and the calculated elapsed time based on a access terminal current SFN derived from a discontinuous counter value generated by a discontinuous counter deactivated during the sleep state; and invoking an SFN reacquisition procedure if the time difference is greater than a threshold.

17. A program product in accordance with claim 16, further comprising:

storing a continuous counter first value and a first SFN value in memory prior to deactivating the discontinuous counter;

activating the discontinuous counter; and setting the discontinuous counter to a counter set value based on continuous counter second value of the continuous counter after the activation of the discontinuous counter.

18. A program product in accordance with claim 17 wherein the determining the time difference comprises:

calculating the continuous counter elapsed time based on a difference between the continuous counter second value and the continuous counter first value; and calculating the calculated elapsed time based on a difference between the access terminal current SFN and the first SFN value.

19. A program product in accordance with claim 18, wherein the SFN reacquisition procedure comprises receiving a current SFN indicator from a communication network.

20. A program product in accordance with claim 19, wherein the SFN reacquisition procedure comprises receiving the current SFN indicator in a Broadcast Channel (BCH).

21. A program product in accordance with claim 20, further comprising invoking the SFN reacquisition procedure when a time from a last SFN reception from the network is greater than a timer threshold.

22. A method for evaluating a system frame number (SFN), comprising:

determining a time difference between a continuous counter elapsed time and a calculated elapsed time, the continuous counter elapsed time generated by a continuous counter remaining active during a sleep state and the calculated elapsed time based on a access terminal current SFN derived from a discontinuous counter value generated by a discontinuous counter deactivated during the sleep state; and invoking an SFN reacquisition procedure if the time difference is greater than a threshold.

23. The method of claim 22, further comprising:

storing a continuous counter first value and a first SFN value in memory prior to deactivating the discontinuous counter;

activating the discontinuous counter; and setting the discontinuous counter to a counter set value based on continuous counter second value of the continuous counter after the activation of the discontinuous counter.

24. The method of claim 23 wherein the determining the time difference comprises:

calculating the continuous counter elapsed time based on a difference between the continuous counter second value and the continuous counter first value; and calculating the calculated elapsed time based on a difference between the access terminal current SFN and the first SFN value.

25. The method of claim 24, wherein the SFN reacquisition procedure comprises receiving a current SFN indicator from a communication network.

26. The method of claim 25, wherein the SFN reacquisition procedure comprises receiving the current SFN indicator in a Broadcast Channel (BCH).

27. The method of claim 26, further comprising invoking the SFN reacquisition procedure when a time from a last SFN reception from the network is greater than a timer threshold.

28. An apparatus for evaluating a system frame number (SFN), comprising:

means for determining a time difference between a continuous counter elapsed time and a calculated elapsed time, the continuous counter elapsed time generated by a continuous counter remaining active during a sleep state and the calculated elapsed time based on a access terminal current SFN derived from a discontinuous counter value generated by a discontinuous counter deactivated during the sleep state; and means for invoking an SFN reacquisition procedure if the time difference is greater than a threshold.

29. The apparatus of claim 28, further comprising:

means for storing a continuous counter first value and a first SFN value in memory prior to deactivating the discontinuous counter;

means for activating the discontinuous counter; and means for setting the discontinuous counter to a counter set value based on continuous counter second value of the continuous counter after the activation of the discontinuous counter.

30. The apparatus of claim 29 wherein the means for determining the time difference further comprise:

means for calculating the continuous counter elapsed time based on a difference between the continuous counter second value and the continuous counter first value; and means for calculating the calculated elapsed time based on a difference between the access terminal current SFN and the first SFN value.

31. The apparatus of claim 30, wherein the means for the SFN reacquisition procedure further comprise means for receiving a current SFN indicator from a communication network.

32. The apparatus of claim 31, wherein the means for the SFN reacquisition procedure further comprise means for receiving the current SFN indicator in a Broadcast Channel (BCH).

33. The apparatus of claim 32, further comprising means for invoking the SFN reacquisition procedure when a time from a last SFN reception from the network is greater than a timer threshold.

* * * * *